No. 886,980.
PATENTED MAY 5, 1908.
W. HORNER.
NAIL.
APPLICATION FILED MAR. 30, 1907.
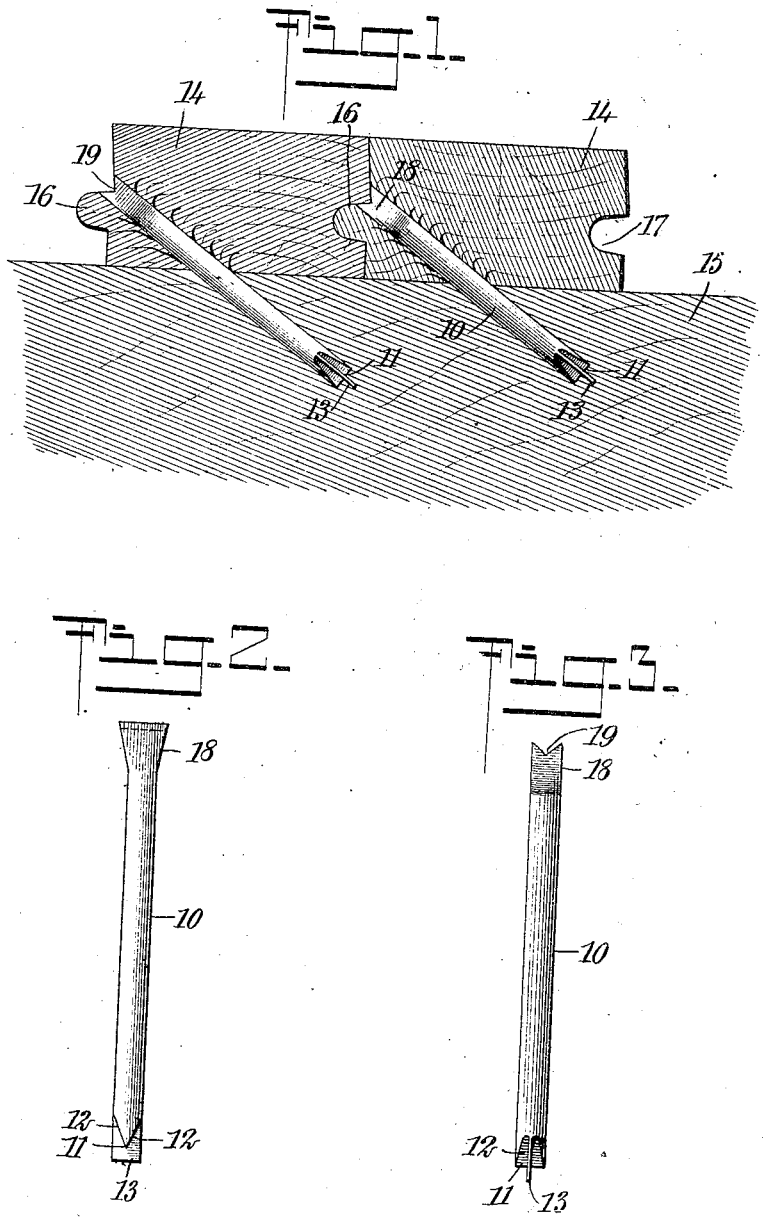
WITNESSES
INVENTOR
William Horner
BY
ATTORNEYS

UNITED STATES PATENT OFFICE.

WILLIAM HORNER, OF REED CITY, MICHIGAN.

NAIL.

No. 886,980.　　　Specification of Letters Patent.　　　Patented May 5, 1908.

Application filed March 30, 1907. Serial No. 365,472.

*To all whom it may concern:*

Be it known that I, WILLIAM HORNER, a citizen of the United States, and a resident of Reed City, in the county of Osceola and State of Michigan, have invented a new and Improved Nail, of which the following is a full, clear, and exact description.

This invention relates to certain improvements in nails, and more particularly to that type of nail especially designed for use in blind nailing through the tongue of matched boards used for floorings, ceilings and the like, and the object of the invention is to provide a nail which will not split the wood, which is rigidly held in a proper relationship to the grain of the wood, and which may be readily driven into place so as not to interfere with the edge of the next adjacent board.

In the present practice it is customary to provide matched flooring with a series of holes adjacent the tongue, whereby the liability of splitting the boards when they are nailed in place is materially reduced, but even then the boards are often split or cracked and a snug fit with the adjacent board is prevented. Furthermore, when holes are bored in a flooring it often happens that no one of the holes comes directly above a joist, and in order to properly hold the flooring in place, nails must be driven into the joist irrespective of the holes prepared in advance for the nails.

According to my invention all wedging effect in the wood produced by the driving of the nail is in a direction lengthwise of the grain rather than crosswise, and the nail is provided with means whereby it is automatically brought to the proper position before it is driven.

Reference is to be had to the accompanying drawings forming a part of this specification, in which similar characters of reference indicate corresponding parts in all the figures, and in which Figure 1 is a transverse section through a portion of flooring secured in place by my improved nails; Fig. 2 is a side elevation of a single nail; and Fig. 3 is an elevation similar to Fig. 2, but taken at right angles thereto.

My improved nail comprises a body portion 10, preferably cylindrical in cross section and differing in no essential particular from the body of an ordinary wire nail. The point end of the nail instead of being brought to a sharp point as is customary in wire nails, terminates in a sharp edge 11 of a width equal to the full diameter of the nail and diametrically disposed in relation thereto, this edge being formed at the intersection of two opposite wedge surfaces 12. As the nail is driven into the wood, the edge 11 is placed across the grain thereof, so that the wedging action as the nail is driven in is entirely lengthwise of the grain. In order to insure a proper placing of the nail in respect to the grain, I provide a thin wing or feather 13 disposed at right angles to the edge 11 and extending to a distance beyond the edge of the same substantially equal to one-half the diameter of the nail body. The wing or feather 13 is of a width equal to the diameter of the nail and is made of no greater thickness than is necessary to secure the desired rigidity.

As previously stated, my improved nail is especially adapted for use in the blind nailing of matched boards, and in Fig. 1 I have illustrated two such boards 14, 14, secured in place to a joist or other suitable support 15. Each board is provided with a tongue 16 in one edge thereof adapted for insertion in a corresponding groove 17 in the edge of the next adjacent board. In securing such boards in place it is customary to drive the nails into the edge directly above the tongue 16, as is indicated in the drawings. In using my improved nail, the nail is placed with the point end in the groove and as the feather or wing 13 extends beyond the edge 11 of the nail, the nail automatically comes to a position in which the wing or feather lies longitudinally of the line of intersection of the tongue and body of the board. This brings the cutting edge 11 at right angles to the grain of the wood, and as the nail is driven into place the wing is always in advance of the cutting edge and follows the grain of the wood, so that the rotation of the nail while it is being driven is positively prevented.

The head end 18 of the nail is preferably rectangular in cross section, its diameter parallel to the cutting edge 11 being substantially equal to the diameter of the body of the nail, while its diameter parallel to the wing or feather 13 is somewhat greater, as is clearly indicated in Figs. 2 and 3. By so constructing the nail an enlarged head is formed, but all of the enlargement is so disposed in respect to the guiding wing or feather 13 that the wedging effect produced as it enters the wood is also longitudinal of the grain and does not tend to produce any splitting effect.

In order that the nail may be driven into place to a sufficient distance to prevent its interfering with the edge of the next adjacent board, I provide the face of the head of the nail with a V-shaped groove 19 running in the direction of the greatest diameter of the nail, and preferably substantially right angular in form. As the nail is driven in place this groove 19 comes parallel with the line of intersection of the tongue and the body of the board, so that when the nail is driven in flush with the surface it coincides with a small portion of the upper surface of the tongue and the end surface of the board. This groove also facilitates the use of a nail set having an edge adapted to enter the groove and adapted to be struck by a hammer to bring the nail to the proper position after the head thereof comes so close to the tongue that there is liability of breaking the latter or marring the upper edge of the board by a misdirected blow of the hammer. This groove also facilitates the use of a nail set in dark corners as the edge of the nail set may be inserted in the groove and rigidly held therein even where the head cannot be seen. As all of the wedging and cutting action is longitudinally of the grain of the wood, the ends of the fibers are turned inward as the nail is driven into place and they thus form inwardly directed barbs or a roughened surface tending to prevent loosening of the nail by slight movements of the board.

Having thus described my invention, I claim as new and desire to secure by Letters Patent:

1. A nail having a cutting edge substantially equal in length to the diameter of the nail, and having a guiding wing or feather diametrically disposed at right angles to said cutting edge and extending beyond the same.

2. A nail, comprising a body portion having a cutting edge, a feather diametrically disposed at right angles to said cutting edge, and a head having a groove parallel to said feather.

3. A nail adapted for use in connection with matched boards having coacting tongues and grooves, said nail comprising a body portion terminating in a single cutting edge formed by two converging surfaces, and means adapted to engage in the line of intersection of a tongue of a board and the body of said board and in advance of the cutting edge of the nail to guide said nail and bring said cutting edge at right angles to said line of intersection.

In testimony whereof I have signed my name to this specification in the presence of two subscribing witnesses.

WILLIAM HORNER.

Witnesses:
   Lou B. Winsor,
   Sam Horner.